(12) United States Patent
Ebacher et al.

(10) Patent No.: US 8,984,859 B2
(45) Date of Patent: Mar. 24, 2015

(54) GAS TURBINE ENGINE AND REHEAT SYSTEM

(75) Inventors: Jon V. Ebacher, Coatesville, IN (US); Carol Noëlle Nin, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 0 days.

(21) Appl. No.: 13/336,261

(22) Filed: Dec. 23, 2011

(65) Prior Publication Data

US 2012/0285137 A1    Nov. 15, 2012

Related U.S. Application Data (60) Provisional application No. 61/427,737, filed on Dec. 28, 2010.

(51) Int. Cl.
| | | |
|---|---|---|
| *F02K 3/10* | (2006.01) | |
| *F01D 5/08* | (2006.01) | |
| *F02K 3/08* | (2006.01) | |
| *F02C 3/16* | (2006.01) | |

(52) U.S. Cl.
CPC ... *F02K 3/08* (2013.01); *F02C 3/16* (2013.01); *F02K 3/10* (2013.01); *Y02E 20/16* (2013.01)
USPC .......... 60/241; 60/761; 60/765; 60/766; 416/97 R; 416/231 B (58) Field of Classification Search
USPC ......... 60/39.17, 241, 740, 761–766; 415/114, 415/115, 116, 97 R, 231 B
See application file for complete search history.

(56) References Cited

U.S. PATENT DOCUMENTS

| | | | | |
|---|---|---|---|---|
| 2,242,767 | A | * | 5/1941 | Traupel ........................ 60/39.17 |
| 2,488,867 | A | | 11/1949 | Judson |
| 2,609,176 | A | | 9/1952 | Purvis |
| 2,654,566 | A | | 10/1953 | Boyd et al. |
| 3,600,892 | A | | 8/1971 | Bryce |
| 4,257,734 | A | | 3/1981 | Guy et al. |
| 4,391,565 | A | | 7/1983 | Speak |
| 4,714,407 | A | | 12/1987 | Cox et al. |
| 4,897,020 | A | | 1/1990 | Tonks |
| 5,398,496 | A | | 3/1995 | Taylor et al. |
| 5,400,589 | A | * | 3/1995 | Mahias et al. .................. 60/762 |
| 5,577,378 | A | | 11/1996 | Althaus et al. |
| 5,616,001 | A | | 4/1997 | Boyd |
| 6,360,776 | B1 | | 3/2002 | McCormick et al. |
| 6,619,026 | B2 | | 9/2003 | Carelli et al. |
| 6,817,187 | B2 | | 11/2004 | Yu |
| 6,830,427 | B2 | | 12/2004 | Lafarge et al. |

(Continued)

OTHER PUBLICATIONS

International Search Report and Written Opinion, PCT/US2011/067305, Rolls-Royce North American Technologies Inc., May 23, 2012.

*Primary Examiner* — Phutthiwat Wongwian
*Assistant Examiner* — William Breazeal
(74) *Attorney, Agent, or Firm* — Krieg DeVault LLP (57) ABSTRACT

One embodiment of the present invention is a unique gas turbine engine. Another embodiment is a unique reheat system for a gas turbine engine. Other embodiments include apparatuses, systems, devices, hardware, methods, and combinations for gas turbine engines and reheat systems. Further embodiments, forms, features, aspects, benefits, and advantages of the present application shall become apparent from the description and figures provided herewith.

22 Claims, 3 Drawing Sheets

(56) References Cited

U.S. PATENT DOCUMENTS

| | | | |
|---|---|---|---|
| 6,868,676 B1* | 3/2005 | Haynes | 60/776 |
| 2002/0122459 A1 | 9/2002 | McFarland et al. | |
| 2003/0033813 A1 | 2/2003 | Flatman et al. | |
| 2004/0091353 A1 | 5/2004 | Shahpar et al. | |
| 2005/0106022 A1 | 5/2005 | MacManus | |
| 2005/0262847 A1* | 12/2005 | Koshoffer | 60/761 |
| 2007/0033945 A1 | 2/2007 | Goldmeer et al. | |
| 2007/0220898 A1* | 9/2007 | Hessler | 60/776 |
| 2009/0185903 A1 | 7/2009 | Beeck et al. | |

* cited by examiner

FIG. 5C

GAS TURBINE ENGINE AND REHEAT SYSTEM

CROSS REFERENCE TO RELATED APPLICATIONS

The present application claims benefit of U.S. Provisional Patent Application No. 61/427,737, filed Dec. 28, 2010, entitled Gas Turbine Engine and Reheat System, which is incorporated herein by reference.

GOVERNMENT RIGHTS

The present application was made with United States government support under Contract No. F33615-03-2300-DO-2 awarded by the United States Air Force. The United States government may have certain rights in the present application.

FIELD OF THE INVENTION

The present invention relates to gas turbine engines, and more particularly, to a gas turbine engine hot section component and method for making the same.

BACKGROUND

Gas turbine engines and reheat systems for gas turbine engines remain an area of interest. Some existing systems have various shortcomings, drawbacks, and disadvantages relative to certain applications. Accordingly, there remains a need for further contributions in this area of technology.

SUMMARY

One embodiment of the present invention is a unique gas turbine engine. Another embodiment is a unique reheat system for a gas turbine engine. Other embodiments include apparatuses, systems, devices, hardware, methods, and combinations for gas turbine engines and reheat systems. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Figure 1:
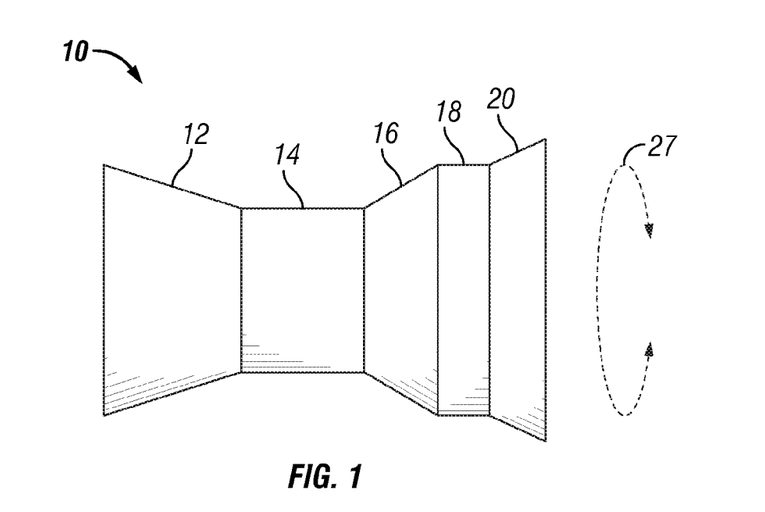
FIG. 1 schematically illustrates some aspects of a non-limiting example of a gas turbine engine in accordance with an embodiment of the present invention.

Referring now to the drawings, and in particular FIG. 1, some aspects of a non-limiting example of a gas turbine engine 10 in accordance with an embodiment of the present invention are depicted. In one form, gas turbine engine 10 is an air vehicle propulsion power plant. In other embodiments, gas turbine engine 10 may be an aircraft auxiliary power unit, a land-based engine or a marine engine. In one form, gas turbine engine 10 is a turbofan engine. In other embodiments, gas turbine engine 10 may be a single or multi-spool turbofan, turboshaft, turbojet, and/or turboprop gas turbine and/or combined cycle engine.

Gas turbine engine 10 includes a compressor system 12, a primary combustion system 14, a turbine system 16, a reheat combustion system 18 and a turbine system 20. Compressor system 12 includes a plurality of blades and vanes in one or more stages configured to pressurize incoming air. Combustion system 14 is fluidly disposed between compressor system 12 and turbine system 16. Combustion system 14 is operative to mix fuel with air received from compressor system 12 and combust the mixture. Turbine system 16 is operative to extract energy from the hot gases exiting combustion system 14. Reheat combustion system 18 is fluidly disposed downstream of turbine system 16 and upstream of turbine system 20. Reheat combustion system is operative to add heat to the got gases exiting turbine system 16, prior to the hot gases entering turbine system 20. Turbine system 16 and turbine system 20 each include rotating turbine blades (not shown) for extracting power from the hot gases. In one form, turbine system 16 and turbine system 20 include stationary turbine vanes. In other embodiments, turbine systems 16 and 20 may employ counter-rotating blades in addition to or in place of turbine vanes. In one form, turbine system 16 and turbine system 20 drive separate shafts. In other embodiments, turbine 16 and turbine 20 may be mechanically coupled to the same shaft.

During the operation of gas turbine engine 10, air is drawn into the inlet of compressor system 12, pressurized and discharged into combustion system 14. Fuel is mixed with the pressurized air in combustion system 14, which is then combusted. The combustion products are directed into turbine system 16, which extracts energy in the form of mechanical shaft power to drive compressor system 12. The hot gases exiting turbine system 16 are directed past reheat combustion system 18, which adds thermal energy to the hot gases in the form of a reheat flow. Turbine system 20 extracts energy in the form of mechanical shaft power from the reheated hot gases, e.g., to drive a fan system (not shown). In other embodiments, turbine system 20 may be operative to drive all or part of compressor system 12. In still other embodiments, turbine system 20 may be operative to drive a gearbox, a generator, a pump and/or other mechanical power absorbing devices.

Figure 2:
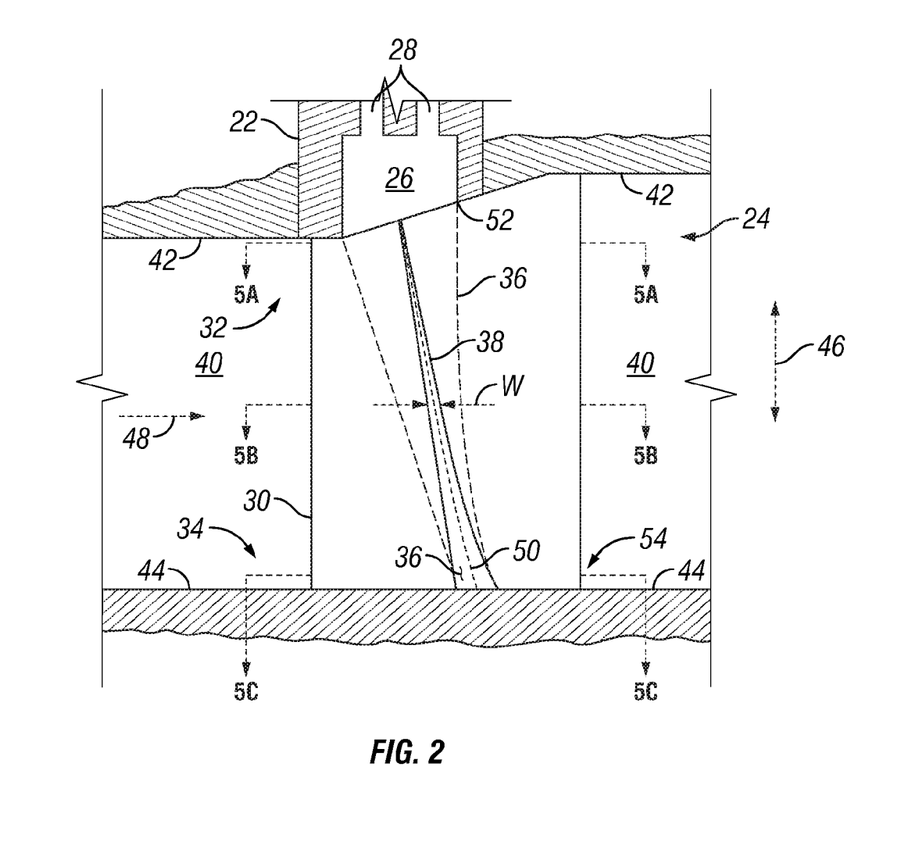
FIG. 2 depicts some aspects of a non-limiting example of a reheat system in accordance with an embodiment of the present invention.

Referring now to FIG. 2 in conjunction with FIG. 1, some aspects of a non-limiting example of reheat combustion system 18 in accordance with an embodiment of the present invention are described. Reheat combustion system 18 is a secondary combustor of gas turbine engine 10, and includes a structure 22 and a structure 24. Structure 22 includes a cavity 26 oriented along an engine 10 circumferential direction 27. Cavity 26 is fed by a plurality of swirl injection ports 28 spaced apart circumferentially around cavity 26. In one form, swirl injection ports 28 supply fuel and air to cavity 22. In other embodiments, fuel and/or air may be supplied by means not shown. In one form, cavity 26 is a combustion reaction cavity and is operative to provide a reheat flow to structure 24. In a particular form, cavity 26 is a secondary combustor of engine 10 that contains the reheat combustion process' primary zone. In other embodiments, cavity 26 may contain not only the primary zone, but other combustion process zones as well, e.g., one or both of the intermediate zone and the dilution zone. In still other embodiments, cavity 26 may not be a combustion reaction cavity. In one form, the combustion process is initiated via auto ignition by introducing fuel into a pressurized high temperature flow that includes oxygen. In other embodiments, the combustion process may be initiated by other means, e.g., spark ignition, detonation or catalysis in addition to or in place of auto ignition.

Structure 24 is configured in material and geometry for operation in a hot section flowpath downstream of combustor 14. Structure 24 has a body 30 extending between a tip portion 32 and a hub portion 34. Body 30 includes an internal cavity 36 and an exhaust port arrangement 38. In one form, body 30 is an airfoil. In a particular form, body 30 is an inter-turbine nozzle guide vane. In other embodiments, structure 24 may take other forms, and may be, for example and without limitation, a strut that does not have an airfoil cross section, or any other form. In one form, structure 24 is disposed within a turbine flowpath 40 defined by an outer flowpath wall 42 and an inner flowpath wall 44. Flowpath 40 is the flowpath for engine 10 core flow. In one form, structure 24 is operative to transmit radial loads through turbine flowpath 40. In other embodiments, structure 24 may be operative to transmit any one or more of radial loads, axial loads and circumferential loads. In still other embodiments, structure 24 may not be operative to transmit loads through turbine flowpath 40. In one form, flowpath walls 42 and 44 are formed separately from structure 24. In other embodiments, part or all of one or both of flowpath walls 42 and 44 may be formed integrally with structure 24. In still other embodiments, part or all of one or both of flowpath walls 42 and 44 are otherwise affixed to, coupled to, assembled with and/or disposed adjacent to structure 24.

Cavity 36 extends in a spanwise direction 46 between tip portion 32 and hub portion 34 of body 30. Cavity 36 is a reheat flow distribution cavity that is operative to distribute reheat flow to flowpath 40 via exhaust port arrangement 38. In one form, distribution cavity 36 is a combustion reaction cavity. In other embodiments, cavity 36 may not be a combustion reaction cavity. In one form, cavity 36 has a centerline 50. In one form, centerline 50 extends not only in spanwise direction 46, but also extends in circumferential direction 27 and in a flowpath direction 48 representative of the general direction of flow of hot gases through turbine flowpath 40. In other embodiments, centerline 50 may extend in only one or two of spanwise direction 46, circumferential direction 27 and flowpath direction 48. Spanwise direction 46, circumferential direction 27 and flowpath direction 48 form a three-dimensional cylindrical coordinate system that is used to define the extents of cavity 36. In other embodiments, other three-dimensional coordinate systems or two dimensional systems may be employed.

Cavity 36 includes an inlet portion 52. Inlet portion 52 is operative to receive a reheat flow from cavity 26 of structure 22 for distribution into flowpath 40 and turbine system 20 via flowpath 40. In one form, inlet portion 52 is disposed in tip portion 32 of body 30. In other embodiments, inlet portion 52 may be located in hub portion 34, e.g., in embodiments wherein reheat flow is supplied to cavity 36 from radially inward of structure 24. In still other embodiments, more than one inlet portion may be employed, e.g., at one or more of tip portion 32, hub portion 34 or one or more locations therebetween.

Reheat flow is a hot gas flow having a higher temperature than the main flowpath gases approaching structure 24 in flowpath direction 48, e.g., from a turbine stage upstream of structure 24, which is used to increase the temperature of those gases flowing in flowpath direction 48 from upstream of structure 24. In one form, the reheat flow received into cavity 36 is a combustion process intermediate zone flow. In other embodiments, the reheat flow received into cavity 36 may be a combustion process primary zone or dilution zone flow. In still other embodiments, the reheat flow received into cavity 36 may be combustion products downstream of a dilution zone. In still other embodiments, the reheat flow may be hot gases and fuel, e.g., wherein the primary combustion zone is fully or partially contained within cavity 36.

Exhaust port arrangement 38 is operative to expose cavity 36 to turbine flowpath 40 and to discharge the reheat flow into turbine flowpath 40 to reheat the gases passing through turbine flowpath 40 into turbine system 20. In one form, exhaust port arrangement 38 is located on the suction side of body 30 (e.g., with body 30 in the form of an airfoil). In other embodiments, exhaust port arrangement 38 may be positioned at other locations on body 30. Spanwise direction 46, circumferential direction 27 and flowpath direction 48 form a three-dimensional cylindrical coordinate system that is used to define the extents of exhaust port arrangement 38. In other embodiments, other three-dimensional coordinate systems or two dimensional systems may be employed.

It is desirable that the distribution of reheat flow exiting exhaust port arrangement 38 be approximately uniformly in spanwise direction 46. A uniform distribution of reheat flow in spanwise direction 46 reduces adverse impact on the life of turbine system 20 components downstream of structure 24 relative to similar systems not employing reheat, and relative to reheat systems that do not provide a uniform distribution of reheat flow. In addition, a uniform distribution of reheat flow in spanwise direction 46 reduces adverse impacts to engine 10 efficiency, such as would occur due to changes in incidence angle along spanwise direction 46 of the core flow in flowpath 40 during reheat operation, and which would occur as due to changes in incidence angle as between engine 10 operation with reheat operation and engine 10 operation without reheat operation.

Figure 3:
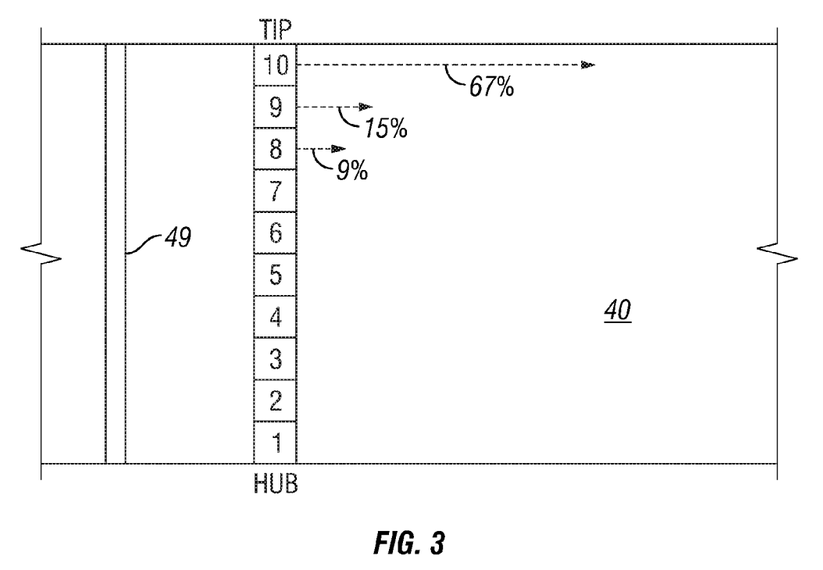
FIG. 3 schematically illustrates the output of a previous reheat system

However, the inventors have determined that some previous reheat systems deliver most of the reheat flow at spanwise locations immediately adjacent to the reheat flow source (e.g., the reheat flow source being akin to inlet portion 52, wherein most of the reheat flow is delivered to the flowpath via the portions of the exhaust arrangement immediately adjacent to the reheat flow source). For example, referring now to FIG. 3, the bulk of the flow distribution output by a previous reheat system is schematically illustrated. In the example of FIG. 3, one previous reheat system employed an exhaust port arrangement having a uniform flow area in the spanwise direction (i.e., uniform width of the exhaust port opening in the spanwise direction from tip to hub). The previous reheat system was analyzed by subdividing the exhaust port flow area into 10% control volume increments. Because the width of the exhaust port is uniform, each control volume increment corresponds to 10% of the height of the exhaust port. The flow distribution was found to yield approximately 67% of the reheat flow exiting the exhaust port via the upper 10% of the exhaust port height in spanwise direction (adjacent to the reheat flow source at the tip of the previous system); approximately 15% of the reheat flow exiting the exhaust port in the second 10% increment of the exhaust port height in the spanwise direction; approximately 9% of the reheat flow exiting the exhaust port in the third 10% increment of the exhaust port height in the spanwise direction; and most of the balance of the reheat flow (not shown) exiting the exhaust port in the next 10% increment of the exhaust port height in the spanwise direction.

The inventors determined that by controlling unit flow area of exhaust port arrangement 38 based on local pressure gradients, the uniformity of distribution in spanwise direction 46 of reheat flow from exhaust port arrangement 38 may be improved. In one form, the unit flow area of exhaust port arrangement 38 is the flow area per unit height in spanwise direction 46. In other embodiments, unit flow area may be the flow area per unit length along any two or three dimensional reference curve, e.g., including the centerline of exhaust port arrangement 38. One such pressure gradient is a distribution cavity pressure gradient, which is the pressure gradient inside cavity 36, e.g., as measured along centerline 50 or in spanwise direction 46. In other embodiments, the variation in pressure may be considered along any two or three dimensional reference curve, e.g., including centerline 50 of cavity 36. Another such pressure gradient is an exhaust pressure gradient, which is the pressure gradient normal to cavity 36, e.g., normal to centerline 50, in the direction of flow from cavity 36 into flowpath 40. The inventors determined that the exhaust pressure gradient varies not only with the pressure inside cavity 36, but also varies based on location within flowpath 40. For example, the pressure in flowpath 40 varies in flowpath direction 48, spanwise direction 46, and circumferential direction 27.

The inventors also determined that by controlling the cross sectional area of cavity 36 based on the pressure gradients, the uniformity of distribution in spanwise direction 46 of reheat flow from exhaust port arrangement 38 may be improved. In addition, the inventors found that the pressure in flowpath 40 varies with location, e.g., in flowpath direction 48, or along the chord of body 30 (e.g., in one or both of flowpath direction 48 and circumferential direction 27, depending upon the shape of body 30). The inventors determined that the distribution of reheat flow may also be enhanced by considering the variation in pressure in flowpath direction 48 and the variation in pressure in circumferential direction 27. That is, the inventors determined that the exhaust pressure gradient varies not only with the pressure inside cavity 36, but also varies based on location within flowpath 40. For example, the pressure in flowpath 40 varies in flowpath direction 48, in spanwise direction 46, and in circumferential direction 27. In one form, the geometries of cavity 36 and of exhaust port arrangement 38 are varied along flowpath direction 48 and circumferential direction 36 with location in spanwise direction 46 to take advantage of the variations in pressure in flowpath 40 in order to improve the distribution of reheat flow.

Figure 4:
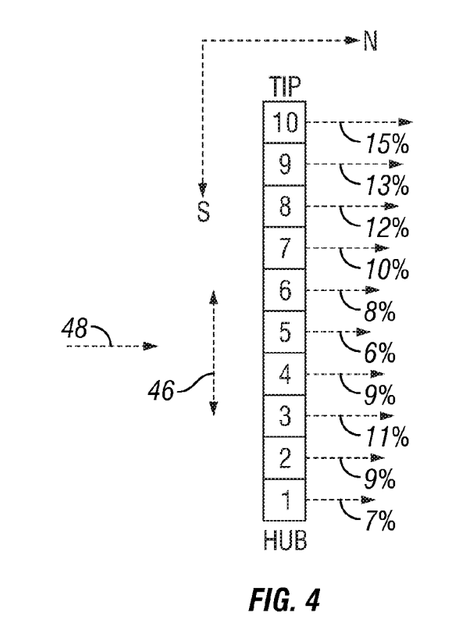
FIG. 4 schematically illustrates some aspects of a non-limiting example of the calculated output of a reheat system in accordance with an embodiment of the present invention.

In order to determine the geometry of exhaust port arrangement 38 and cavity 36, various methods may be employed. In one relatively simply approach, exhaust port arrangement 38 is subdivided into a number of control volumes. In one example, 10 control volumes between the tip and hub of body 30 were selected, e.g., as illustrated in FIG. 4. The flow per unit area, e.g., per control volume, given by q/A, is a function of the pressure gradient, as set forth in Equation 1:

$$\frac{q}{A} = f(\nabla P), \quad \text{(Equation 1)}$$

Where q is flow rate, A is area and P is pressure.

Preferably, the reheat flow exiting exhaust port arrangement 38 is evenly distributed, such that the flow from each control volume of exhaust port arrangement 38 is the same, e.g., as set forth in Equation 2:

$$q_{ni} = \text{constant}, \quad \text{(Equation 2)}$$

where n indicates the normal direction relative to the slot, and hence $q_{ni}$ is the $i^{th}$ control volume flow from exhaust port arrangement 38 into flowpath 40, e.g., normal to the slot; and where i=10 in the present example (10 control volumes). The number of control volumes may vary with the needs of the application.

The total reheat flow from exhaust arrangement 38 is given by Equation 3:

$$q_{total} = \text{sum}(q_{ni}) \quad \text{(Equation 3)}$$

The flow in cavity 36 is given by equation 4:

$$q_{si} = \sum_{j=1}^{i} q_{nj} = q_{s,i-1} + q_{n,i-1}, \quad \text{(Equation 4)}$$

where s indicates the direction along cavity 36, and hence $q_{si}$ is the $i^{th}$ control volume flow in cavity 36 (i.e., the reheat flow from one control volume to the next within cavity 36 in spanwise direction 46 or centerline 50).

The flow area for each control volume for cavity 36 and for exhaust port arrangement 38 is given by Equation 5:

$$A_{si}\frac{dp}{ds_i} = (i-1)A_{ni}\frac{dp}{dn_i}, \quad \text{(Equation 5)}$$

Wherein $A_{si}$ is the cross-sectional area of cavity 36 for the $i^{th}$ control volume; $A_{ni}$ is the flow area for exhaust port arrangement 38 for the $i^{th}$ control volume; $dp/ds_i$ is the pressure gradient along cavity 36 for the $i^{th}$ control volume; and $dp/dn_i$ is the pressure gradient between exhaust port arrangement 38 and flowpath 40 at the $i^{th}$ control volume.

In one form, Equations 1-5 are employed to obtain the shape of cavity 36 and exhaust port arrangement 38. In other embodiments, Equations 1-5 are employed to obtain preliminary results, which are then refined using commercially available or in-house computer code. In still other embodiments, other methods may be employed to obtain shape of cavity 36 and exhaust port arrangement 38.

Figure 5A:
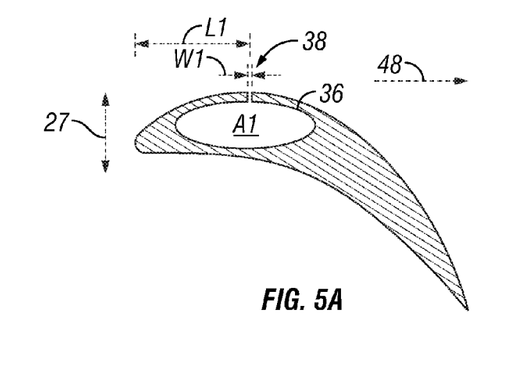
FIGS. 5A-5C illustrate cross sections through the reheat system illustrated in FIG. 2.
Figure 5B:
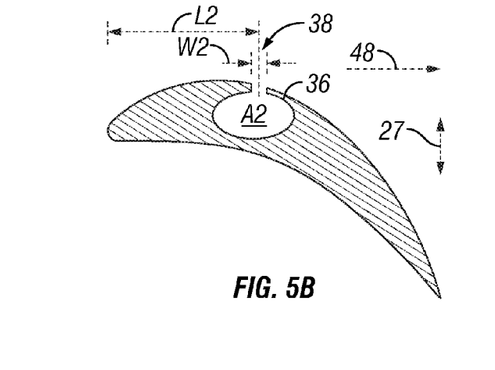
Figure 5C:
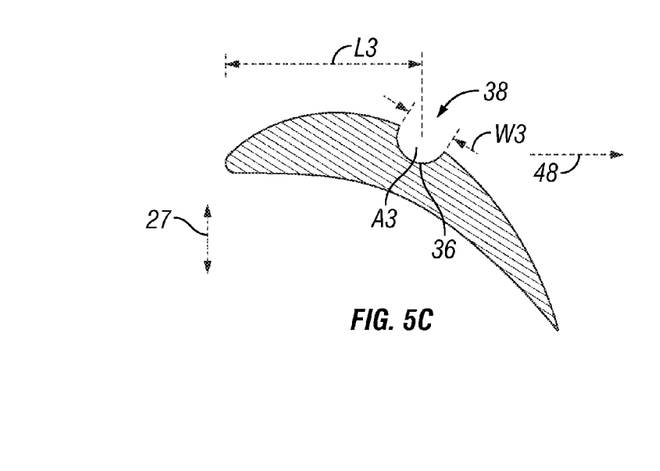

Referring now to FIGS. 5A-5C in conjunction with FIG. 2, in order to promote uniform flow distribution, the present non-limiting example includes the following three geometric design features: (1) a width W of exhaust port arrangement 38 that varies in spanwise direction 46; (2) a cross sectional flow area of cavity 36 that varies in spanwise direction 46; and (3) a centerline of cavity 36 and/or of exhaust port arrangement 38 that varies in location along flowpath direction 48 and circumferential direction 27 with location in spanwise direction 46. In other embodiments, any one or more of the referenced geometric design features may be employed, alone or in combination with another of the geometric design features. In one form, the centerline of exhaust port arrangement 38 and centerline 50 of cavity 36 have the same axial position in flowpath direction 48, and hence are coincident in the direction of view of FIG. 2. In other embodiments, exhaust port arrangement 38 may have a different centerline location than centerline 50 of cavity 36.

All three of the aforementioned geometric design features are present in the example described herein. That is, exhaust port arrangement 38 width W, e.g., as measured in flowpath direction 48, varies with location in spanwise direction 46. For example, width W1 in the tip region of body 30 is less than width W2 in the mid-span region of body 30, which is less than width W3 in the hub region of body 30. In one form, width W varies based on one or more pressure gradients at the location in spanwise direction 46, e.g., at a selected engine operating condition. In a particular form, the pressure gradients used to determine the width W of exhaust port arrangement 38 at each location along spanwise direction 46 are (i) the distribution cavity pressure gradient; and (ii) the exhaust pressure gradient normal to cavity 36. In other embodiments, other pressure gradients in addition to or in place of those described herein may be employed. In one form, width W of exhaust port arrangement 38 increases with distance from the inlet portion 52 of the cavity 36.

In addition, cavity 36 has a cross-sectional area that varies with location in spanwise direction 46. For example cross sectional area A1 is greater than cross sectional area A2, which is greater than cross sectional area A3. In one form, the cross sectional area varies based on the pressure gradient at the location in spanwise direction 46, e.g., at a selected engine operating condition. In a particular form, the pressure gradients used to determine the cross-sectional area of cavity 36 at each location along spanwise direction 46 are (i) the distribution cavity pressure gradient; and (ii) the exhaust pressure gradient normal to cavity 36. In other embodiments, other pressure gradients in addition to or in place of those described herein. In one form, cavity 36 has a cross-sectional area that decreases with distance from inlet portion 52.

Further, cavity 36 and exhaust port arrangement 38 are configured with centerlines 50 that vary in location along flowpath direction 48 and circumferential direction 27 based on the pressure gradients, e.g., at a selected engine operating condition, e.g., to take advantage of lower pressures in flowpath 40 near the hub trailing edge 54 of body 30 in the present example. For example, the distance L1 from the leading edge of body 30 in flowpath direction 48 to the center of exhaust port arrangement 38 is less than distance L2 from the leading edge of body 30 in flowpath direction 48 to the center of exhaust port arrangement 38, which is less than distance L3 from the leading edge of body 30 in flowpath direction 48 to the center of exhaust port arrangement 38.

As set forth above all three of the aforementioned geometric design features are employed in the example described and illustrated herein. In other embodiments, only one or two of the aforementioned geometric design features may be employed.

In one form, exhaust port arrangement 38 is an elongate slot that extends from tip portion 32 to a hub portion 34. In other embodiments, exhaust port arrangement may take other forms. For example, in some embodiments, exhaust port arrangement 38 may take the form of a plurality of openings that have widths or average widths that increase in spanwise direction 46 away from inlet portion 52.

The distribution of reheat flow obtained from a non-limiting example of cavity 36 and exhaust port arrangement 38 yielded the fairly uniform results depicted in FIG. 4, wherein the reheat flow from the uppermost control volume (#10) (adjacent to the tip) is approximately 15% of the total reheat flow; the reheat flow from the next control volume (#9) is approximately 13% of the total reheat flow; the reheat flow from the next control volume (#8) is approximately 12% of the total reheat flow; the reheat flow from the next control volume (#7) is approximately 10% of the total reheat flow; the reheat flow from the next control volume (#6) is approximately 8% of the total reheat flow; the reheat flow from the next control volume (#5) is approximately 6% of the total reheat flow; the reheat flow from the next control volume (#4) is approximately 9% of the total reheat flow; the reheat flow from the next control volume (#3) is approximately 11% of the total reheat flow; the reheat flow from the next control volume (#2) is approximately 9% of the total reheat flow; and the reheat flow from the bottom control volume (#1) (adjacent the hub) is approximately 7% of the total reheat flow. In other embodiments, other distributions may be obtained.

Embodiments of the present invention include a gas turbine engine hot section component, comprising: a flowpath structure configured for operation in a gas turbine engine flowpath downstream of a primary combustor of the gas turbine engine, wherein the flowpath structure includes: a body having a tip portion and a hub portion, wherein the body includes a cavity therein extending in a spanwise direction between the tip portion and the hub portion; wherein the cavity includes an inlet portion operative to receive a reheat flow into the cavity; and an exhaust port arrangement operative to expose the cavity to the gas turbine engine flowpath, wherein the exhaust port arrangement is configured with a width in a flowpath direction that varies with location in the spanwise direction based on a pressure gradient at the location in the spanwise direction at a selected engine operating condition.

In a refinement, the exhaust port arrangement is configured with a centerline that varies in location along a flowpath direction based on the pressure gradient.

In another refinement, the cavity has a cross-sectional area that varies with location in the spanwise direction based on the pressure gradient.

In yet another refinement, the cavity has a cross-sectional area that decreases with distance from the inlet portion of the cavity.

In still another refinement, the width of the exhaust port arrangement increases with distance from the inlet portion of the cavity.

In yet still another refinement, the exhaust port arrangement is an elongate slot.

In a further refinement, the body is an airfoil.

In a yet further refinement, the cavity is a combustion reaction cavity.

Embodiments of the present invention include a gas turbine engine, comprising: a compressor system; a primary combustor; a turbine system including a hot section component, the hot section component including: a flowpath structure configured for operation in a gas turbine engine flowpath downstream of a primary combustor of the gas turbine engine, wherein the flowpath structure includes: a body having a tip portion and a hub portion, wherein the body includes a cavity therein extending in a spanwise direction between the tip portion and the hub portion; wherein the cavity includes an inlet portion operative to receive a reheat flow for distribution to the turbine system; and an exhaust port arrangement operative to expose the cavity to the gas turbine engine flowpath, wherein the exhaust port arrangement is configured with a width in a flowpath direction that varies with location in the spanwise direction based on a pressure gradient at the location in the spanwise direction at a selected engine operating condition.

In a refinement, the exhaust port arrangement is configured with a centerline that varies in location in a flowpath direction based on the pressure gradient.

In another refinement, the cavity has a cross-sectional area that varies with location in the spanwise direction based on the pressure gradient.

In yet another refinement, the cavity has a cross-sectional area that decreases with distance from the inlet portion of the cavity.

In still another refinement, the width of the exhaust port arrangement increases with distance from the inlet portion of the cavity.

In yet still another refinement, the exhaust port arrangement is an elongate slot.

In a further refinement, the body is an airfoil.

In a yet further refinement, the cavity is a combustion reaction cavity.

In a still further refinement, the inlet portion is operative to receive a reheat flow from a primary zone of a secondary combustor the gas turbine engine.

In another further refinement, the pressure gradient includes a pressure gradient along the cavity.

In yet another further refinement, the pressure gradient includes a pressure gradient normal to the cavity.

Embodiments include a gas turbine engine, comprising: a compressor system; a primary combustor; a turbine system including a hot section component, the hot section component including: a flowpath structure configured for operation in a gas turbine engine flowpath downstream of a primary combustor of the gas turbine engine, wherein the flowpath structure includes: a body having a tip portion and a hub portion, wherein the body includes means extending in a spanwise direction between the tip portion and the hub portion for receiving a reheat flow for distribution to the turbine system; and means for uniformly distributing the reheat flow from the means for receiving into the gas turbine engine flowpath.

In a refinement, the means for uniformly distributing the reheat flow has a width in a flowpath direction that varies with location in the spanwise direction based on a pressure gradient at the location in the spanwise direction.

In another refinement, the means for receiving has a cross-sectional area that varies with location in the spanwise direction based on a pressure gradient at the location in the spanwise direction.

In yet another refinement, the means for uniformly distributing the reheat flow has a centerline that varies in location in a flowpath direction based on a pressure gradient at the location in the flowpath direction.

In still another refinement, the body is an airfoil; and wherein the means for uniformly distributing the reheat flow is located on a suction side of the airfoil.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine, comprising:
    a longitudinal axis lying along an axial direction, and a reheat combustion system;
    a flowpath structure located in a reheat combustion system flowpath, wherein the flowpath structure includes:
    a body radially spanning said flowpath, said body having a tip portion nearest a radially outward boundary of said flowpath and a hub portion nearest a radially inward boundary of said flowpath, wherein the body includes a cavity therein spanning said flowpath in a spanwise direction; wherein the cavity includes an inlet portion operative to receive a reheat flow into the cavity; and
    an elongate exhaust port arrangement spanning said cavity in a spanwise direction and opening in a circumferential direction, with respect to said axial direction, into the flowpath and operative to expose the cavity to the flowpath, wherein the exhaust port arrangement is configured with a width in a flowpath direction that narrows from the hub portion to the tip portion in the spanwise direction.

2. The gas turbine engine of claim 1, wherein the exhaust port arrangement is configured with a centerline that varies in location along the flowpath direction.

3. The gas turbine engine of claim 1, wherein the cavity has a cross-sectional area that varies with location in the spanwise direction.

4. The gas turbine engine of claim 1, wherein the cavity has a cross-sectional area that decreases with distance from the inlet portion of the cavity.

5. The gas turbine engine of claim 1, wherein the width of the exhaust port arrangement increases with distance from the inlet portion of the cavity.

6. The gas turbine engine of claim 1, wherein the exhaust port arrangement is an elongate slot.

7. The gas turbine engine of claim 1, wherein the body is an airfoil.

8. The gas turbine engine of claim 1, wherein the cavity is a combustion reaction cavity.

9. A gas turbine engine, comprising:
    a turbine system;
    a reheat combustion system, wherein said reheat combustion system comprises a hot section component, the hot section component including:
    a flowpath structure located in a reheat combustion system flowpath, wherein the flowpath structure includes:
    a body radially spanning said flowpath, said body having a tip portion nearest a radially outward boundary of said flowpath and a hub portion nearest a radially inward boundary of said flowpath, wherein the body includes a cavity therein spanning said flowpath in a spanwise direction; wherein the cavity includes an inlet portion operative to receive a reheat flow for distribution to the turbine system; and
    a single exhaust port arrangement spanning said cavity in a spanwise direction, operative to expose the cavity to the flowpath, wherein the exhaust port arrangement is configured with a width in a flowpath direction that narrows from the hub portion to the tip portion in the spanwise direction wherein at the tip portion, the width of the exhaust port arrangement in the flowpath direction is less than the width of the cavity in the flowpath direction, and at the hub portion, the width of the exhaust port arrangement in the flowpath direction is substantially the same as the width of the cavity in the flowpath direction.

10. The gas turbine engine of claim 9, wherein the exhaust port arrangement is configured with a centerline that varies in location in the flowpath direction.

11. The gas turbine engine of claim 9, wherein the cavity has a cross-sectional area that varies with location in the spanwise direction.

12. The gas turbine engine of claim 9, wherein the cavity has a cross-sectional area that decreases with distance from the inlet portion of the cavity.

13. The gas turbine engine hot section component of claim 9, wherein the width of the exhaust port arrangement increases with distance from the inlet portion of the cavity.

14. The gas turbine engine of claim 9, wherein the exhaust port arrangement is an elongate slot.

15. The gas turbine engine of claim 9, wherein the body is an airfoil.

16. The gas turbine engine of claim 9, wherein the cavity is a combustion reaction cavity.

17. The gas turbine engine of claim 9, wherein the inlet portion is operative to receive a reheat flow from a primary zone of a secondary combustor the gas turbine engine.

18. The gas turbine of claim 9, further operable to create a pressure gradient along the cavity.

19. The gas turbine engine of claim 18, wherein the pressure gradient includes a pressure gradient normal to the cavity.

20. A gas turbine engine, comprising:
a turbine system;
a reheat combustion system, wherein said reheat combustion system comprises a secondary combustor and a hot section component, the hot section component including:
a flowpath structure located in a reheat combustion system flowpath, wherein the flowpath structure includes:
a body radially spanning said flowpath, said body having a tip portion nearest a radially outward boundary of said flowpath and a hub portion nearest a radially inward boundary of said flowpath, wherein the body includes a cavity extending in a spanwise direction between the tip portion and the hub portion for receiving a reheat flow from a secondary combustor for distribution to the turbine system; and an elongate exhaust port having a width in a flowpath direction that narrows from the hub portion to the tip portion to uniformly distribute the reheat flow from the cavity into the gas turbine engine flowpath;
wherein the body is an airfoil having, in the flowpath direction, a leading edge portion and a trailing edge portion, wherein a suction side and a pressure side of the airfoil extend from the leading edge portion to the trailing edge portion and the suction side is spaced from the pressure side in a circumferential direction, and wherein the elongate exhaust port is located on the suction side of the airfoil.

21. The gas turbine engine of claim 20, wherein the cavity has a cross-sectional area that varies with location in the spanwise direction.

22. The gas turbine engine of claim 20, wherein the cavity has a centerline that varies in location in a flowpath direction.

* * * * *